US007042907B2

(12) United States Patent
Matsunaga

(10) Patent No.: US 7,042,907 B2
(45) Date of Patent: May 9, 2006

(54) PACKET TRANSFER APPARATUS AND METHOD

(75) Inventor: Yasuhiko Matsunaga, Minato-Ku (JP)

(73) Assignee: NEC Corporation, Tokyo (JP)

( * ) Notice: Subject to any disclaimer, the term of this patent is extended or adjusted under 35 U.S.C. 154(b) by 940 days.

(21) Appl. No.: 10/105,385

(22) Filed: Mar. 26, 2002

(65) Prior Publication Data
US 2002/0141448 A1 Oct. 3, 2002

(30) Foreign Application Priority Data
Mar. 27, 2001 (JP) .............................. 2001-089640

(51) Int. Cl.
*H04L 12/28* (2006.01)
*H04L 3/26* (2006.01)
*G06F 15/173* (2006.01)

(52) U.S. Cl. ...................... 370/469; 370/389; 370/432; 709/230

(58) Field of Classification Search ........ 370/230–252, 370/389–395, 401–412, 465–470; 709/230–236
See application file for complete search history.

(56) References Cited
U.S. PATENT DOCUMENTS
5,751,970 A * 5/1998 Bournas ..................... 709/236

6,269,099 B1 * 7/2001 Borella et al. .............. 370/389
6,477,143 B1 * 11/2002 Ginossar ..................... 370/230
2001/0026556 A1 * 10/2001 Yagyu et al. ................ 370/432
2005/0147053 A1 * 7/2005 Saito et al. .................. 370/252

OTHER PUBLICATIONS

W. Richard Stevens, "TCP/IP Illustrustrated, vol. 1: The Protocols", Softbank Books, Mar. 1997, pp. 382-387.
Hasegawa et al., "A study on TCP Throughput Acceleration Mechanism Using On-Board CPU" Multimedia, Distributed, Cooperative and Mobile Symposium, IPSJ Symposium Series vol. 200, No. 7, Jun. 2000, pp. 505-510.

* cited by examiner

*Primary Examiner*—Man U. Phan
(74) *Attorney, Agent, or Firm*—Young & Thompson

(57) ABSTRACT

A packet transfer apparatus includes an MSS option rewrite unit and packet fragmentation unit. The MSS option rewrite unit determines a first maximum segment size used in a transport layer between a transmitting hosts and the packet transfer apparatus on the basis of path information between the transmitting hosts and the packet transfer apparatus, and notifies the transmitting hosts of the first maximum segment size. The MSS option rewrite unit determines a second maximum segment size used in a transport layer between a receiving hosts and the packet transfer apparatus on the basis of path information between the receiving hosts and the packet transfer apparatus, and notifies the receiving hosts of the second maximum segment size.

18 Claims, 14 Drawing Sheets

PACKET TRANSFER APPARATUS AND METHOD

BACKGROUND OF THE INVENTION

The present invention relates to a packet transfer apparatus and method for performing routing of a variable-length packet on the basis of TCP/IP (Transmission Control Protocol/Internet Protocol).

In packet communication based on TCP/IP, a host for transmitting data generally fragments data into small units called packets. Then, the host adds header information such as a transmission source address or destination address to each packet, and sends the resultant packet to a network. At this time, the maximum packet length transmittable from each host to a network is determined by MTU (Maximum Transmission Unit) supported by the protocol of the data link layer (second layer of an OSI reference model) of a network connected to a host for exchanging data.

For example, the MTU value used in major data link layer protocols is 1,500 bytes for Ethernet whose transmission rate is 10/100 Mbps, and 4,352 bytes for FDDI (Fiber Distributed Data Interface). When AAL5 is used in an ATM (Asynchronous Transfer Mode) network or a jumbo frame is supported by Ethernet whose transmission rate is 1 Gbps, the MTU value is about 9,000 bytes.

If the protocol of the transport layer (fourth layer of the OSI reference model) is TCP, the maximum data length which can be contained in each packet is called MSS (Maximum Segment Size). According to the IETF (Internet Engineering Task Force) standard RFC 879 "The TCP Maximum Segment Size and Related Topics", the MSS value is determined by subtracting a default IP header length and TCP header length from the above-mentioned MTU.

For example, for IP version 4, the default IP header length has 20 bytes, and the default TCP header length has 20 bytes. For a 1,500-byte MTU supported by the data link layer protocol, MSS is 1,460 (=1,500−20−20). When transmitting and receiving hosts are connected by the same data link, the most efficient data transmission method is to fragment transmission data and transmit packets.

To the contrary, if transmitting and receiving hosts exist on different networks, MSSs corresponding to the MTUs of data links directly connected to the respective hosts are sent to each other by using additional information called an MSS option in establishing a TCP connection. A smaller MSS is adopted between the two hosts. A path which can only support an MTU smaller than that of a data link directly connected to the transmitting/receiving hosts may exist in the transfer path. In this case, a relay node notifies the transmitting hosts to fragment data into shorter packets during data transfer.

This method is called path MTU discovery. "Path MTU" means the smallest MTU in the packet transfer path. Path MTU discovery is described in detail in W. Richard Stevens, "TCP/IP Illustrated, Volume 1: The Protocols", pp. 382–387, March 1997. The transmitting/receiving hosts performs data communication using MTU and MSS as large as possible because of the following reason. In general, as the fragmentation unit increases in fragmenting data into packets and transmitting the packets, the network transfer efficiency also increases. Higher network transfer efficiency decreases the CPU utilization factor, i.e., processing load of the transmitting/receiving hosts.

However, data transmission/reception via a wide area network suffers a transfer path which cannot always use a large MTU due to restrictions by data link specifications or problems caused by the physical channel quality. For example, when various pieces of information are to be downloaded by a general subscriber from a server connected to a packet communication network by using a public access network, the data link (access link) between the subscriber house and a packet transfer apparatus nearest to the subscriber house often uses media such as a metallic line, coaxial cable, and radio channel. The physical qualities of these media are not so high, which makes it difficult to adopt a large MTU.

To the contrary, the data link between the server and the packet transfer apparatus nearest to the subscriber house often uses large-capacity, high-quality media such as an optical fiber. This enables supporting a relatively large MTU. The MSS of the transport layer is determined by a data link having the smallest MTU out of MTUs on the transfer path. Even if all other data links support large MTUs, the subscriber must communicate with the server by using a small MTU corresponding to the physical quality of the access link.

A conventional packet transfer apparatus in a network may execute packet fragmentation in the data link layer or network layer (third layer of the OSI reference model), but does not perform packet fragmentation in the transport layer. On the contrary, packet fragmentation in the transport layer may be done by a gateway which terminates communication between receiving and transmitting hosts once in the application layer (seventh layer of the OSI reference model), like a World Wide Web proxy server. In this case, however, connection is completely terminated in the transport layer. The processing load greatly increases, and this method is not employed for a high-traffic relay.

A conventional method of performing communication between transmitting and receiving hosts using an MSS larger than an MSS determined by the smallest MTU among MTUs supported by respective transfer paths has been proposed in Hasegawa et al., "A Study on TCP Throughput Acceleration Mechanism using On-board CPU", Multimedia, Distributed, Cooperative and Mobile Symposium, pp. 505–510, June 2000. This reference discloses the following method. Dedicated boards are mounted on transmitting and receiving hosts, and segmentation and reassembly of TCP segments are achieved on the dedicated boards. A plurality of packets actually supplied through a network are transmitted at once to the CPUs of the hosts.

This method decreases the frequency of packet processing by the CPU of the transmitting/receiving hosts, and the load on the CPU can be decreased. However, the packet length actually transferred through a network is determined by the smallest MTU among MTUs supported by transfer paths, like the prior art, and the network transfer efficiency cannot be increased.

General data communication using TCP adopts "slow start" which gradually increases the transfer rate every time the transmitting hosts receives an acknowledge from the receiving hosts after the start of communication. In current packaging of slow start in almost every host, the default value of a congestion window after the start of communication is set to MSS or double the MSS, as described in Section 3 of the IETF standard RFC 2581 "TCP Congestion Control". Every time the transmitting hosts receives an acknowledge from the receiving hosts, the congestion window is increased by MSS.

This method is efficient when the network transfer delay is relatively small between transmitting and receiving hosts. If, however, the network transfer delay is very large, like packet communication via a radio link, even transfer of a small amount of data takes a long transfer time.

As a conventional measure against this problem, there is proposed an initial window increasing method of setting the default value of the congestion window of a transmitting hosts larger than double the MSS. This is also described in the IETF standard RFC 2414 "Increasing TCP's Initial Window". However, the network transfer delay varies between transmitting and receiving hosts. If the default value of the congestion window of the transmitting hosts is uniquely set large in accordance with that of the receiving hosts suffering a large network transfer delay, relay network congestion occurs.

SUMMARY OF THE INVENTION

It is an object of the present invention to provide a packet transfer apparatus and method which increase the packet transfer efficiency in transferring packets based on TCP/IP.

It is another object of the present invention to provide a packet transfer apparatus and method which shorten the transfer time in transferring a small amount of data.

To achieve the above objects, according to the present invention, there is provided a packet transfer apparatus which is connected between transmitting and receiving hosts that perform packet communication complying with TCP/IP (Transmission Control Protocol/Internet Protocol), and transfers a packet on the basis of a connection established by exchanging control packets between the transmitting and receiving hosts before start of data packet exchange, comprising MSS option rewrite means for determining a first maximum segment size used in a transport layer between the transmitting hosts and the packet transfer apparatus on the basis of path information between the transmitting hosts and the packet transfer apparatus in establishing a connection, notifying the transmitting hosts of the first maximum segment size, determining a second maximum segment size used in a transport layer between the receiving hosts and the packet transfer apparatus on the basis of path information between the receiving hosts and the packet transfer apparatus, and notifying the receiving hosts of the second maximum segment size, and packet fragmentation means for, when the first maximum segment size of a connection corresponding to a transfer packet is larger than the second maximum segment size, fragmenting a data part subsequent to a header of a transport layer of a packet received from the transmitting hosts into a plurality of segments in accordance with the second maximum segment size, and transferring to the receiving hosts a fragmented packet assembled by adding a header copied from header information of the received packet to each fragmented segment.

DESCRIPTION OF THE PREFERRED EMBODIMENTS

The present invention will be described in detail below with reference to the accompanying drawings.

Figure 1:
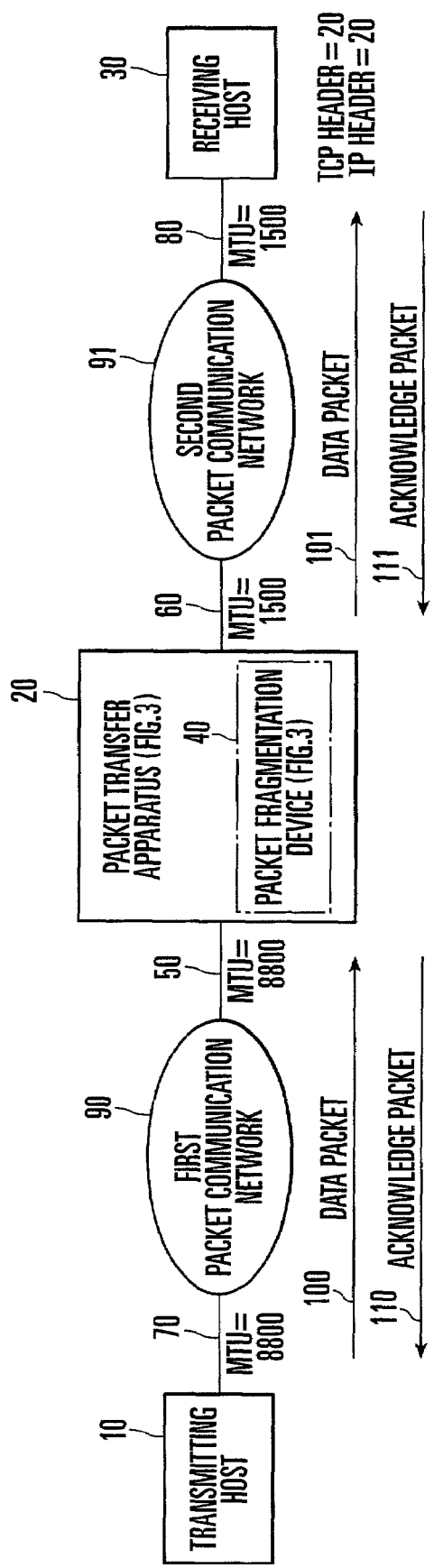
FIG. 1 is a view showing the structure of a network according to the first embodiment of the present invention.

FIG. 1 shows a network to which a packet transfer apparatus according to the first embodiment of the present invention is applied. A transmitting hosts 10 is connected to a first packet communication network 90 via a third data link 70. A packet transfer apparatus 20 is connected to the first packet communication network 90 via a first data link 50, and to a second packet communication network 91 via a second data link 60. A receiving hosts 30 is connected to the second packet communication network 91 via a fourth data link 80.

A data packet 100 output from the transmitting hosts 10 is fragmented by a packet fragmentation device 40 installed in the packet transfer apparatus 20, and transferred as a data packet 101 to the receiving hosts 30. The receiving hosts 30 receives the data packet 101 from the packet transfer apparatus 20. Then, the receiving hosts 30 outputs an acknowledge packet 111, and the packet transfer apparatus 20 transfers an acknowledge packet 110 to the transmitting hosts 10.

The MTU (Maximum Transmission Unit) supported by the first, second, third, and fourth data links changes depending on the network structure. In the following description, the first and third data links 50 and 70 support an MTU of 8,800 bytes, and the second and fourth data links 60 and 80 support an MTU of 1,500 bytes. The transmitting hosts 10 and receiving hosts 30 transfer files by a standard client server application based on TCP/IP. The default lengths of TCP and IP headers are 20 bytes.

Figure 2:
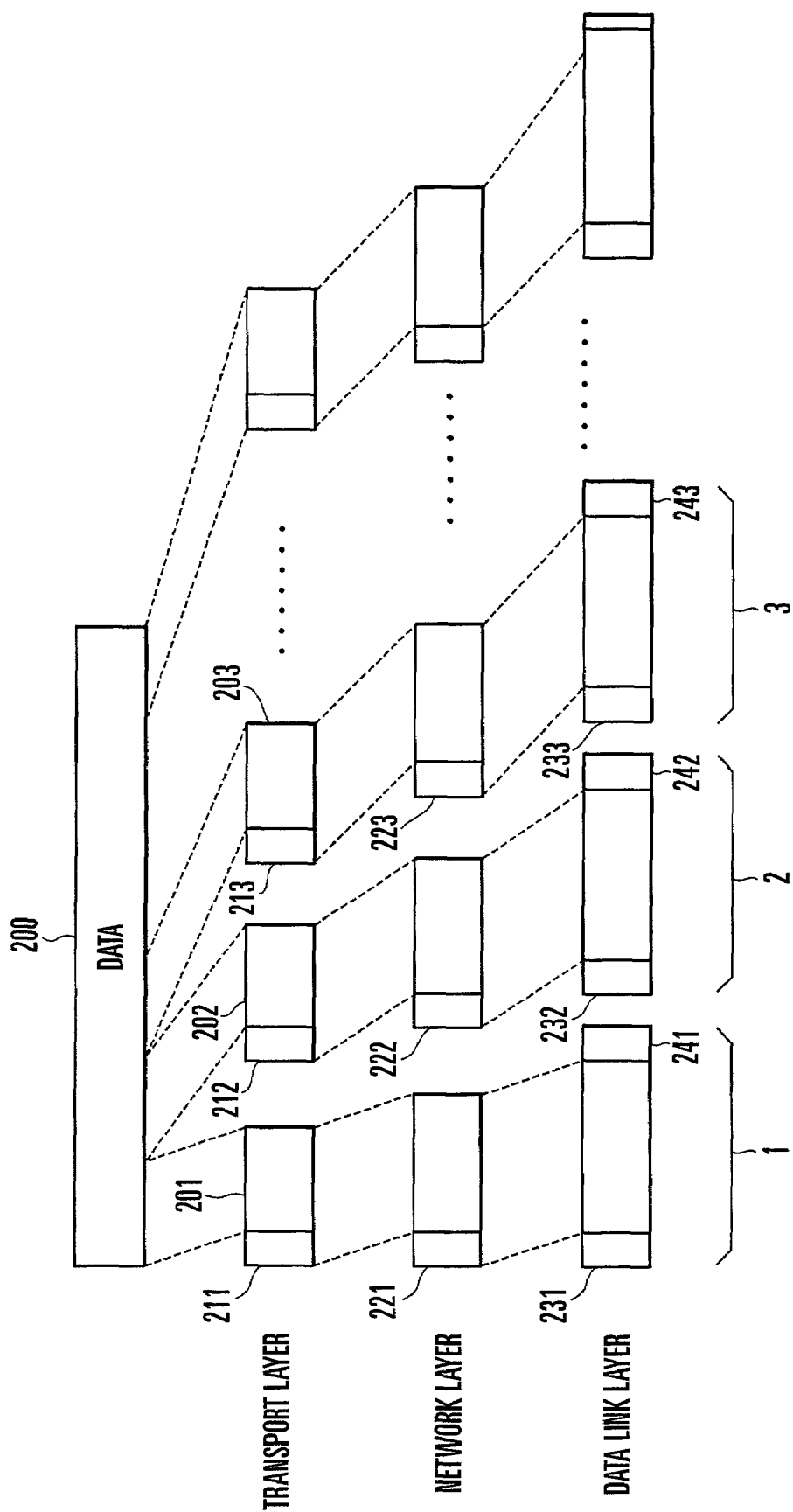
FIG. 2 is a view for explaining a data fragmentation method in a transmitting hosts shown in FIG. 1.

FIG. 2 shows a data fragmentation method in the transmitting hosts.

The transmitting hosts 10 fragments data 200 to be transmitted in transport layer processing into a plurality of segments 201, 202, 203, . . . in accordance with the TCP MSS (Maximum Segment size). The transmitting hosts 10 generates TCP headers 211, 212, 213, . . . and adds them. The MSS value used by the transmitting hosts 10 is determined by negotiation with the receiving hosts 30 in establishing a connection. In network layer processing, the transmitting hosts 10 adds IP headers 221, 222, 223, . . . to the respective segments in the transport layer. In data link layer processing, the transmitting hosts 10 adds headers 231, 232, 233, . . . and trailers 241, 242, 243,. . . . After that, the transmitting hosts 10 transits the respective packets to the receiving hosts 30.

Figure 3:
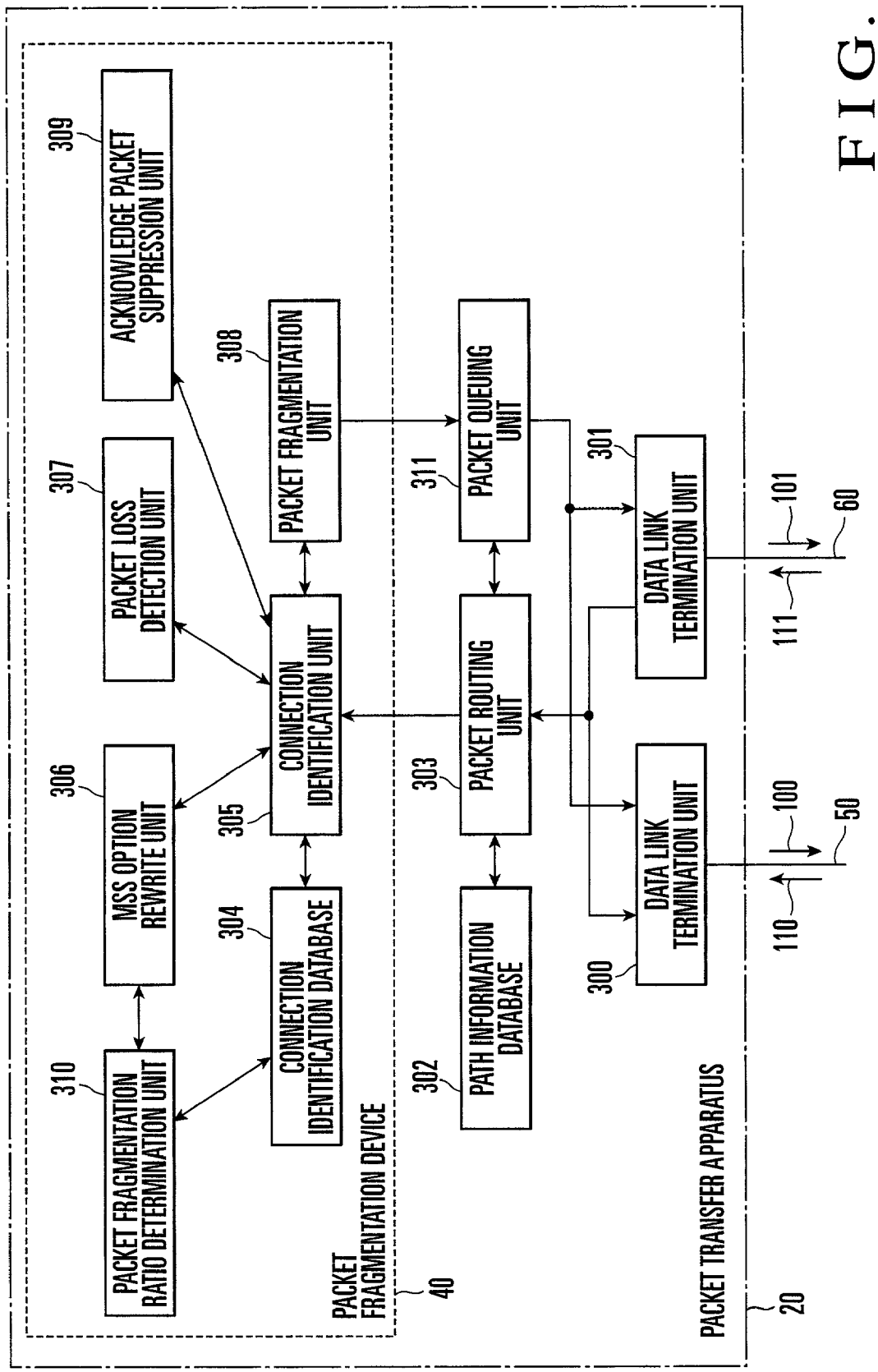
FIG. 3 is a block diagram showing a packet transfer apparatus and packet fragmentation device shown in FIG. 1.

FIG. 3 shows the block arrangements of the packet transfer apparatus and packet fragmentation device.

The packet transfer apparatus 20 comprises data link termination units 300 and 301, a path information database 302, a packet routing unit 303, a packet queuing unit 311, and the packet fragmentation device 40. The packet fragmentation device 40 comprises a connection identification database 304, a connection identification unit 305, an MSS option rewrite unit 306, a packet loss detection unit 307, a packet fragmentation unit 308, an acknowledge packet suppression unit 309, and a packet fragmentation ratio determination unit 310.

In the packet transfer apparatus 20, the data link termination unit 300 extracts the data link layer header and trailer from the data packet 100 input from the first data link 50 on the transmitting hosts 10 side. The data link termination unit 300 outputs the resultant packet to the packet routing unit 303. The data link termination unit 300 adds the data link layer header and trailer to an acknowledge packet output from the packet queuing unit 311, and outputs the resultant packet to the first data link 50. In addition, the data link termination unit 300 performs access control, error correction, window control, and the like in accordance with the specifications of the first data link 50. The data link termination unit 301 executes the same processing as that of the data link termination unit 300 with respect to the second data link 60 on the receiving hosts 30 side.

The packet routing unit 303 is connected to the data link termination units 300 and 301. The packet routing unit 303 determines the IP address of the next hop and the output interface of a packet on the basis of the destination IP address of an input packet and the contents of the path information database 302.

The path information database 302 is connected to the packet routing unit 303. Similar to a general router, the contents of the path information database 302 are statically input from outside the packet transfer apparatus or dynamically generated using a routing protocol which acts between a plurality of packet transfer apparatuses. The packet queuing unit 311 is connected to the data link termination units 300 and 301, and temporarily holds a packet output from the packet fragmentation device 40 in accordance with the rate of an output destination data link.

In the packet fragmentation device 40, the connection identification unit 305 is connected to the packet routing unit 303. The connection identification unit 305 refers to the connection identification database 304 on the basis of header information of an input packet, and identifies the connection between the transmitting hosts 10 and the receiving hosts 30 that corresponds to the input packet. The connection identification database 304 is connected to the connection identification unit 305, and holds connection identification information for identifying connections between a plurality of transmitting hosts and the receiving host. The connection identification information contains a destination/transmission source IP address, transport layer protocol type, and destination/transmission source port number.

The connection identification unit 305 identifies the connection of an input packet from the packet routing unit 303. Then, the connection identification unit 305 outputs to the packet fragmentation unit 308 transfer control information containing connection identification information of the connection, packet fragmentation ratio, and host MSS value, together with the input packet. When the transport layer protocol of an input packet is TCP, the connection identification unit 305 checks the presence/absence of a SYN flag in the TCP header and detects a new connection.

The MSS option rewrite unit 306 is connected to the connection identification unit 305. When the connection identification unit 305 detects a new connection and the TCP header of an input packet contains an MSS option, the MSS option rewrite unit 306 calculates a corresponding intermediate node MSS value from an MTU value supported by the output destination data link of the packet. The calculated value is output to the packet fragmentation ratio determination unit 310 together with the host MSS value represented by the MSS option.

The packet fragmentation ratio determination unit 310 is connected to the MSS option rewrite unit 306 and connection identification database 304. When the intermediate node MSS output from the MSS option rewrite unit 306 is larger than the host MSS value, the packet fragmentation ratio determination unit 310 determines an MSS value to be sent to the transmitting hosts 10 so as to set the packet fragmentation ratio to an integer of 2 or more. The packet fragmentation ratio determination unit 310 outputs the determined MSS value to the MSS option rewrite unit 306. If the packet fragmentation ratio is less than 2, the packet fragmentation ratio determination unit 310 controls the MSS option rewrite unit 306 so as not to rewrite the MSS option.

If the upper limit of the packet fragmentation ratio is externally set, the packet fragmentation ratio determination unit 310 determines an MSS value to be sent to the transmitting hosts 10 so as not to exceed the set value, and outputs the determined MSS value to the MSS option rewrite unit 306. The MSS option rewrite unit 306 rewrites the MSS option in accordance with an instruction from the packet fragmentation ratio determination unit 310. In accordance with the rewritten contents, the MSS option rewrite unit 306 rewrites the sequence number of a TCP header and recalculates the checksum.

The packet fragmentation unit 308 is connected to the connection identification unit 305 and packet queuing unit 311. The packet fragmentation unit 308 fragments an input packet from the connection identification unit 305 on the basis of transfer control information from the connection identification unit 305. The packet fragmentation unit 308 transfers the fragmented packet to the receiving hosts 30 via the packet queuing unit 311 and data link termination unit 301. At this time, if the MSS option is not rewritten or a host MSS value notified by the transmitting hosts 10 is smaller than the host MSS value of the receiving hosts 30, the packet fragmentation unit 308 directly transfers the data packet 100 input from the transmitting hosts 10 to the receiving hosts 30 without fragmenting the data packet 100.

If the MSS option rewrite unit 306 rewrites the MSS option and the host MSS value notified by the transmitting hosts 10 is larger than the host MSS value of the receiving hosts 30, the packet fragmentation unit 308 fragments the data packet 100 input from the transmitting hosts 10, and transfers the fragmented packet to the receiving hosts 30. The packet fragmentation unit 308 fragments a data part subsequent to the TCP header of the input data packet 100. The packet fragmentation unit 308 copies the IP and TCP headers and adds them to each fragmented packet. If necessary, the packet fragmentation unit 308 recalculates the sequence number and checksum.

The fragmentation data unit of the packet fragmentation unit 308 is set to a smaller one of the host MSS value notified by the receiving hosts 30 and the intermediate node MSS value corresponding to the MTU supported by the second data link 60. The packet fragmentation unit 308 sequentially outputs packets to the packet queuing unit 311 upon the completion of fragmentation processing for the input packet.

The acknowledge packet suppression unit 309 is connected to the connection identification unit 305, and holds the sequence number of a finally transferred packet among data packets fragmented by the packet fragmentation unit 308. When the acknowledge packet suppression unit 309 receives from the receiving hosts 30 an acknowledge packet belonging to a connection transferred by fragmenting a packet, the unit 309 checks whether the held sequence number coincides with a sequence number contained in the acknowledge packet. As a result, the acknowledge for the finally transferred packet among fragmented packets is detected. Based on the detection result, the acknowledge packet suppression unit 309 notifies the connection identification unit 305 to transfer only an acknowledge packet for the finally transferred packet and discard the remaining acknowledge packets.

The packet loss detection unit 307 is connected to the connection identification unit 305, and checks the TCP header of an input acknowledge packet. If the packet loss detection unit 307 receives acknowledge packets having the same sequence number a plurality of number of times or receives an acknowledge packet having a selective acknowledge (SACK) option, it detects that a transferred data packet has been lost, and notifies the connection identification unit 305 of a message to this effect. The connection identification unit 305 transfers an input acknowledge packet when it is notified of the loss of a data packet from the packet loss detection unit 307 during an acknowledge packet suppression request from the acknowledge packet suppression unit 309.

In this manner, the packet fragmentation device 40 stops acknowledge packet transfer suppression when a data packet is lost. This can hasten the packet retransmission timing in the transmitting hosts 10.

The operation of the first embodiment will be explained with reference to FIG. 4.

When file transfer is to be performed between the transmitting hosts 10 and the receiving hosts 30 using a general client-server application, the receiving hosts 30 transmits a TCP SYN packet 400 to the packet transfer apparatus 20 in order to establish a connection between the receiving hosts 30 and the transmitting hosts 10. At this time, the MSS value represented by the receiving hosts 30 is 1,460 (=1,500−20−20) bytes in accordance with MTU supported by the fourth data link 80.

Upon reception of the TCP SYN packet via the second data link 60, the packet transfer apparatus 20 overwrites 8,760 (=8,800−20−20) bytes with the MSS option value in accordance with the MTU supported by the first data link 50, and then transfers a TCP SYN packet 401 to the transmitting host 10. Upon reception of the TCP SYN packet 401, the transmitting hosts 10 outputs a TCP SYN ACK packet 402 to the receiving hosts 30. At this time, the MSS option field value in the TCP SYN ACK packet 402 that is generated by the transmitting hosts 10 is 8,760 bytes in accordance with the MTU supported by the third data link 70.

Upon reception of the TCP SYN ACK packet 402, the packet transfer apparatus 20 checks the MSS option value and directly transfers a TCP SYN ACK packet 403 to the receiving hosts 30. Upon reception of the TCP SYN ACK packet 403, the receiving hosts 30 generates a TCP ACK packet 404 and sends back an acknowledge toward the transmitting hosts 10. The packet transfer apparatus 20 receives the TCP ACK packet 404 from the receiving hosts 30 and transfers it as a TCP ACK packet 405 to the transmitting hosts 10.

After the transmitting hosts 10 receives the TCP ACK packet 405, the connection between the transmitting hosts 10 and the receiving hosts 30 is established, and data packets can be transmitted. Then, the transmitting hosts 10 fragments data in accordance with a smaller value of the MSS represented by the receiving hosts 30 by means of the TCP SYN packet 401 and the MSS represented by the transmitting hosts 10 by means of the TCP SYN ACK packet 402. In this case, both the MSS values are 8,760 bytes, and the data fragmentation unit is 8,760 bytes. The transmitting hosts 10 cuts out 8,760 bytes from the start of transmission data, adds a header, and transmits a TCP data packet 406 to the receiving hosts 30.

Upon reception of the TCP data packet 406, the packet transfer apparatus 20 fragments a data part subsequent to the TCP header by the packet fragmentation device 40. The fragmentation unit is a smaller one of the host MSS represented by the receiving hosts 30 by means of the TCP SYN packet 401 and the intermediate node MSS supported by the second data link 60. In this case, the fragmentation unit has 1,460 bytes. In the packet transfer apparatus 20, the packet fragmentation device 40 fragments a part subsequence to the TCP header of the TCP data packet 406 into six packets each having 1,460 bytes. The packet fragmentation device 40 adds TCP/IP headers, and outputs TCP data packets 407, 408, 409, 410, 411, and 412.

Upon reception of these TCP data packets, the receiving hosts 30 sends back an acknowledge representing reception of the data to the transmitting hosts 10. In general TCP packaging, an acknowledge is sent back upon successive reception of data double the MSS in length. For this reason, the receiving hosts 30 generates TCP ACK packets 413, 414, and 415 at the respective reception timings of the TCP data packets 408, 410, and 412, and outputs the TCP ACK packets 413, 414, and 415 toward the transmitting hosts 10.

Upon reception of the TCP ACK packets 413, 414, and 415 from the receiving hosts 30, the packet transfer apparatus 20 checks their sequence numbers. Based on the check result, the packet transfer apparatus 20 transfers to the transmitting hosts 10 only the TCP ACK packet 415 serving as an acknowledge to the finally fragmented/transmitted TCP data packet 412. The packet transfer apparatus 20 discards the remaining TCP ACK packets 413 and 414. Upon reception of a TCP ACK packet 416, the transmitting hosts 10 similarly generates TCP data packets and transmits them to the receiving hosts 30 until the transmitting hosts 10 receives acknowledges to all the data.

According to the first embodiment, maximum packet sizes independently used in respective packet transfer paths are optimized on the basis of path information between the transmitting hosts 10 and the packet transfer apparatus 20 and path information between the packet transfer apparatus 20 and the receiving hosts 30. Communication overhead relatively occupied by packet headers can be reduced to increase the packet transfer efficiency.

Figure 4:
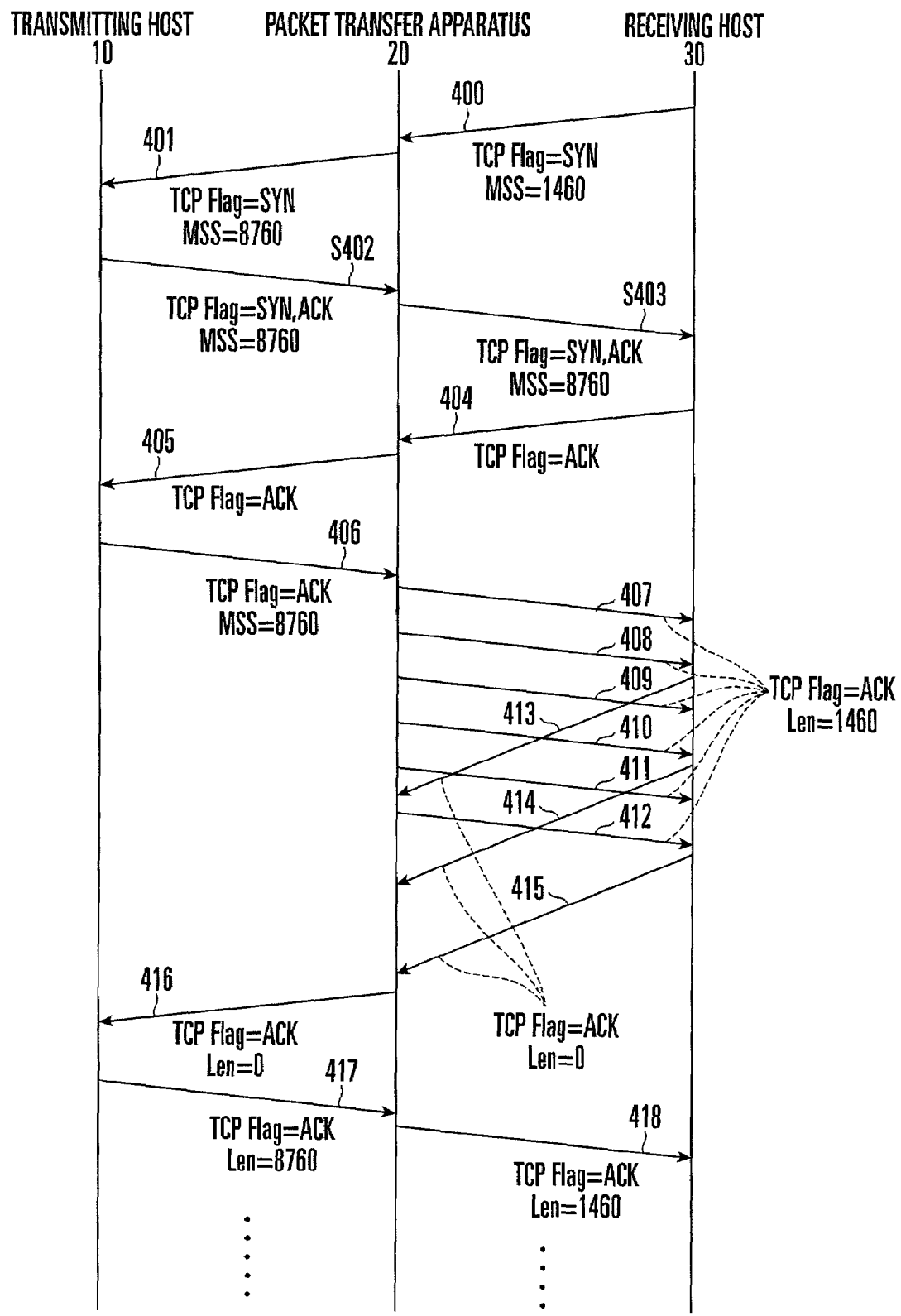
FIG. 4 is a view showing a message sequence between the transmitting hosts, the packet transfer apparatus, and a receiving hosts shown in FIG. 1.

As is apparent from FIG. 4, the receiving hosts 30 is not particularly conscious of packet fragmentation executed in the packet transfer apparatus 20. This is equivalent to an increase in initial window on the transmitting hosts 10 side by the fragmentation ratio of the packet fragmentation device 40. The present invention can shorten the data acquisition time without changing the TCP packaging on the host side in transferring a small amount of data.

According to the first embodiment, the packet fragmentation device 40 comprises the acknowledge packet suppression unit 309. If a plurality of acknowledges are received from the receiving hosts with respect to a plurality of fragmented packets, the acknowledge packet suppression unit 309 instructs the connection identification unit 305 to discard acknowledges to packets preceding the finally transmitted packet among fragmented packets. The connection identification unit 305 transfers to the transmitting hosts 10 only an acknowledge to the finally transmitted packet among the fragmented packets.

When packet fragmentation is done, the number of acknowledges generated by the receiving hosts 30 is larger in the packet fragmentation device 40 than the number of acknowledges generated when no packet fragmentation is done. Even if these acknowledges are directly transferred to the transmitting hosts 10, the transmitting hosts 10 is not particularly conscious of the presence of the packet fragmentation device 40, and determines that only some of packets transmitted from the receiving hosts 30 are acknowledged.

If the TCP packaging in the transmitting hosts 10 receives such a partial acknowledge (partial ACK), no problem occurs unless the congestion window is widened. If, however, the TCP packaging in the transmitting hosts 10 is so set as to widen the congestion window even upon reception of a partial ACK, the congestion window is widened unnecessarily fast, and the transmitting hosts increases the transfer rate too fast.

According to the first embodiment, only an acknowledge to the finally transmitted packet among fragmented packets is transferred to the transmitting hosts 10. This suppresses a partial ACK and enables maintaining normal slow start operation of the transmitting hosts 10.

According to the first embodiment, the packet fragmentation device 40 comprises the packet loss detection unit 307. Upon reception of an acknowledge from the receiving hosts 30, the packet loss detection unit 307 notifies the connection identification unit 305 of the loss of a transferred packet. In general, the loss of a packet is detected by the contents of an acknowledge packet input from the receiving hosts 30. In this case, the packet fragmentation device 40 detects the loss of a packet by reception of acknowledge packets having the same sequence number a plurality of number of times or reception of an acknowledge packet having a selective acknowledge (SACK) option.

With the use of the packet loss detection unit 307, the connection identification unit 305 can transmit a received acknowledge to the transmitting hosts 10 even if the acknowledge is not one for the finally transmitted packet among fragmented packets. The transmitting hosts 10 is quickly notified of the loss of a packet, and the time until the transmitting hosts retransmits the lost packet is shortened. The packet transfer rate can be increased even in an environment where packets are often lost.

According to the first embodiment, the packet fragmentation device 40 comprises the MSS option rewrite unit 306. The MSS value used between the transmitting hosts and the packet transfer apparatus is so determined as to set the data segment size conversion ratio to an integer of 2 or more. When the data segment size conversion ratio is almost 1 in the packet transfer apparatus 20, addition of a header to each fragmented packet may decrease the transfer efficiency. The MSS option rewrite unit 306 enables outputting a packet after a packet input to the packet fragmentation device 40 is fragmented into a plurality of packets equal in size. The packet transfer efficiency can be maximized.

According to the first embodiment, the MSS option rewrite unit 306 in the packet fragmentation device 40 determines the MSS value used between the transmitting hosts 10 and the packet transfer apparatus 20 so as to prevent the data segment size conversion ratio from exceeding an upper limit set in advance. A too high ratio of a data segment size to be converted in the packet transfer apparatus 20 may cause burst data transfer and congestion of a network for transferring packets. These problems can be avoided by adjusting the data segment size conversion ratio by the MSS option rewrite unit 306 so as not to exceed the upper limit externally set in advance.

Figure 5:
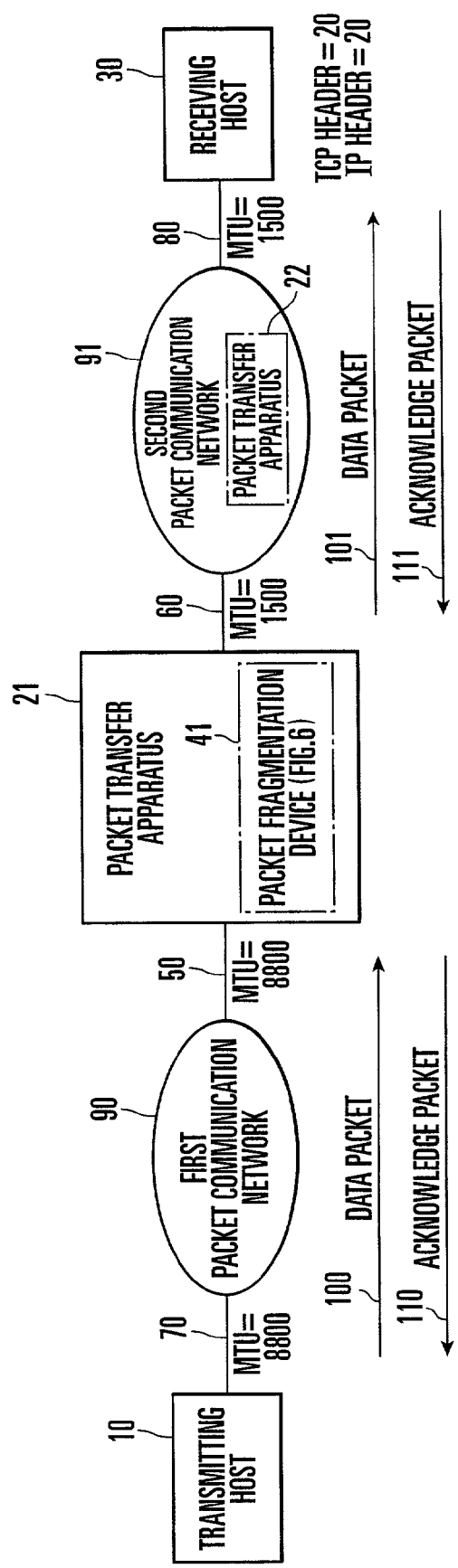
FIG. 5 is a view showing the structure of a network according to the second embodiment of the present invention.
Figure 6:
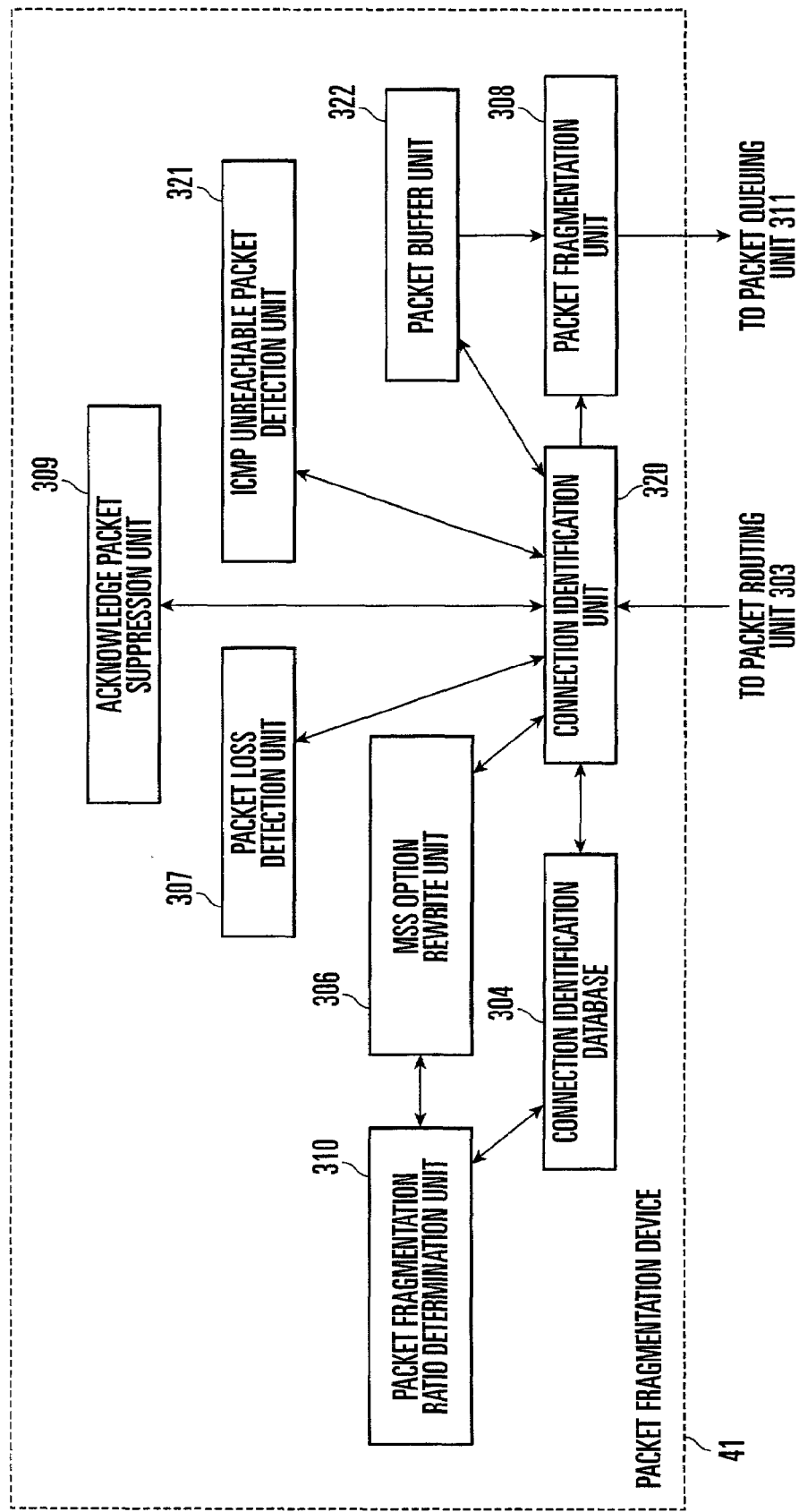
FIG. 6 is a block diagram showing a packet fragmentation device shown in FIG. 5.

A network to which a packet transfer apparatus according to the second embodiment of the present invention is applied will be described with reference to FIG. 5. The second embodiment is different from the first embodiment in that a packet transfer apparatus 21 comprises a packet fragmentation device 41 and that a second packet communication network 91 incorporates a packet transfer apparatus 22. The second packet transfer apparatus may not have any packet fragmentation function. The remaining arrangement is the same as that in the first embodiment, the same reference numerals denote the same parts, and a description thereof will be omitted. As shown in FIG. 6, the packet fragmentation device 41 is constituted by adding an ICMP (Internet Control Message Protocol) unreachable packet detection unit 321 and packet buffer unit 322 to the packet fragmentation device 40 (FIG. 3) of the first embodiment described above.

In FIG. 6, the ICMP unreachable packet detection unit 321 is connected to a connection identification unit 320, and detects reception of an ICMP destination unreachable message to an established TCP connection. When the code of the received ICMP destination unreachable message is 4, and it is notified that fragmentation is necessary but a fragmentation disable flag is set in an IP header, the ICMP unreachable packet detection unit 321 outputs the MTU of a next-hop network in the received message to the connection identification unit 320.

In accordance with the MTU of the next-hop network output from the ICMP unreachable packet detection unit 321, the connection identification unit 320 dynamically changes the packet fragmentation unit used to transfer packets to a receiving hosts 30. If the MTU of the next-hop network is input from the ICMP unreachable packet detection unit 321, the connection identification unit 320 discards the received ICMP unreachable packet without transferring it to the transmitting hosts 10.

The packet buffer unit 322 temporarily holds TCP data packets fragmented and transmitted by a packet fragmentation unit 308 until reception of an acknowledge to each TCP data packet from the receiving hosts 30. If the MTU of the next-hop network is input from the ICMP unreachable packet detection unit 321 or a packet loss detection unit 307 detects the loss of a transmitted packet, the packet buffer unit 322 outputs a corresponding packet to the packet fragmentation unit 308 and retransmits the packet to the receiving hosts 30.

Figure 7:
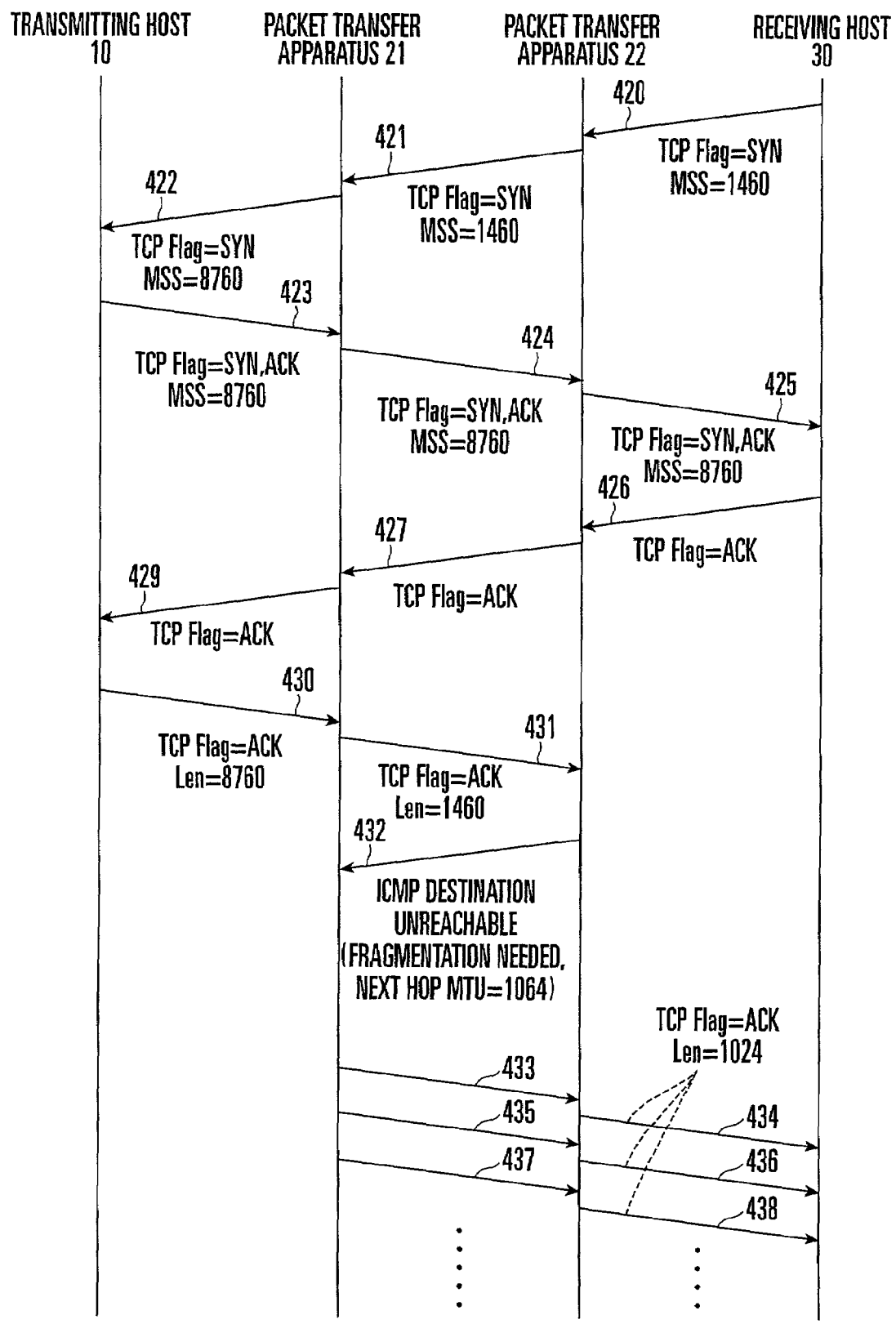
FIG. 7 is a view showing a message sequence between a transmitting hosts, first and second packet transfer apparatuses, and a receiving hosts shown in FIG. 5.

FIG. 7 shows a message sequence between a transmitting hosts 10, the first packet transfer apparatus 21, the second packet transfer apparatus 22, and the receiving hosts 30.

The receiving hosts 30 generates a TCP SYN packet 420 and outputs it to the transmitting hosts 10. The transmitting hosts 10 generates a TCP SYN ACK packet 423 and outputs it to the receiving hosts 30. The receiving hosts 30 generates a TCP ACK packet 426 and transmits it to the transmitting hosts 10. The transmitting hosts 10 receives a TCP ACK packet 429 and establishes a TCP connection. The sequence up to this step is the same as the sequence in FIG. 4.

Then, the packet transfer apparatus 21 fragments a TCP data packet 430 output from the transmitting hosts 10 into six 1,460-byte TCP data packets, and transfers them to the receiving hosts 30.

The second packet transfer apparatus 22 discards a received TCP data packet 431, and outputs an ICMP unreachable packet 432 toward the transmitting hosts 10. The second packet transfer apparatus 22 issues a notification that the MTU of the next-hop network is 1,064 bytes. In this case, the first packet transfer apparatus 21 does not transfer the ICMP unreachable packet 432, but decreases the subsequent packet fragmentation unit to 1,024 bytes. Upon reception of the ICMP unreachable packet 432, the packet transfer apparatus 21 extracts transferred packets from the internal packet buffer unit. After changing the packet size in accordance with the decreased packet fragmentation unit, the packet transfer apparatus 21 retransmits packets to the receiving hosts 30.

When the packet transfer apparatus 22 exists between the receiving hosts 30 and the packet transfer apparatus 21, as shown in FIG. 7, and data fragmentation by the above-mentioned path MTU discovery is needed, the packet transfer apparatus 22 outputs an ICMP unreachable packet toward the transmitting hosts. If the packet transfer apparatus 21 directly transfers the ICMP unreachable packet to the transmitting hosts 10, the transmitting hosts 10 decreases the size of a packet to be output in accordance with the next-hop network represented by the ICMP unreachable packet. This also decreases the packet size between the transmitting hosts and the packet transfer apparatus that need not be changed.

In the second embodiment, an ICMP unreachable packet is input from a network on the receiving hosts 30 side, and data fragmentation is requested. At this time, if an MSS value obtained from the MTU value of the next-hop network is equal to or larger than the MSS used between the transmitting hosts 10 and the packet transfer apparatus 21, only the segment size used between the receiving hosts 30 and the packet transfer apparatus 21 is decreased, and the input ICMP unreachable packet is not transferred to the transmitting hosts.

If the MSS value obtained from the MTU value of the next-hop network is smaller than the MSS used between the transmitting hosts 10 and the packet transfer apparatus 21, the MSS value used between the transmitting hosts 10 and the packet transfer apparatus 21 must be changed. Thus, the received ICMP unreachable packet is directly transferred to the transmitting hosts.

Even upon generation of an ICMP unreachable packet based on path MTU discovery during data transfer, communication continues using the maximum packet size usable in each transfer path in accordance with the path MTU in the transfer path between the transmitting hosts and the packet transfer apparatus and the path MTU in the transfer path between the packet transfer apparatus and the receiving hosts. This can increase the data transfer efficiency.

According to the second embodiment, packets are temporarily buffered until reception of acknowledges to transferred packets, and lost packets can be retransmitted at high speed.

The third embodiment of the present invention will be described with reference to FIG. 8.

Figure 8:
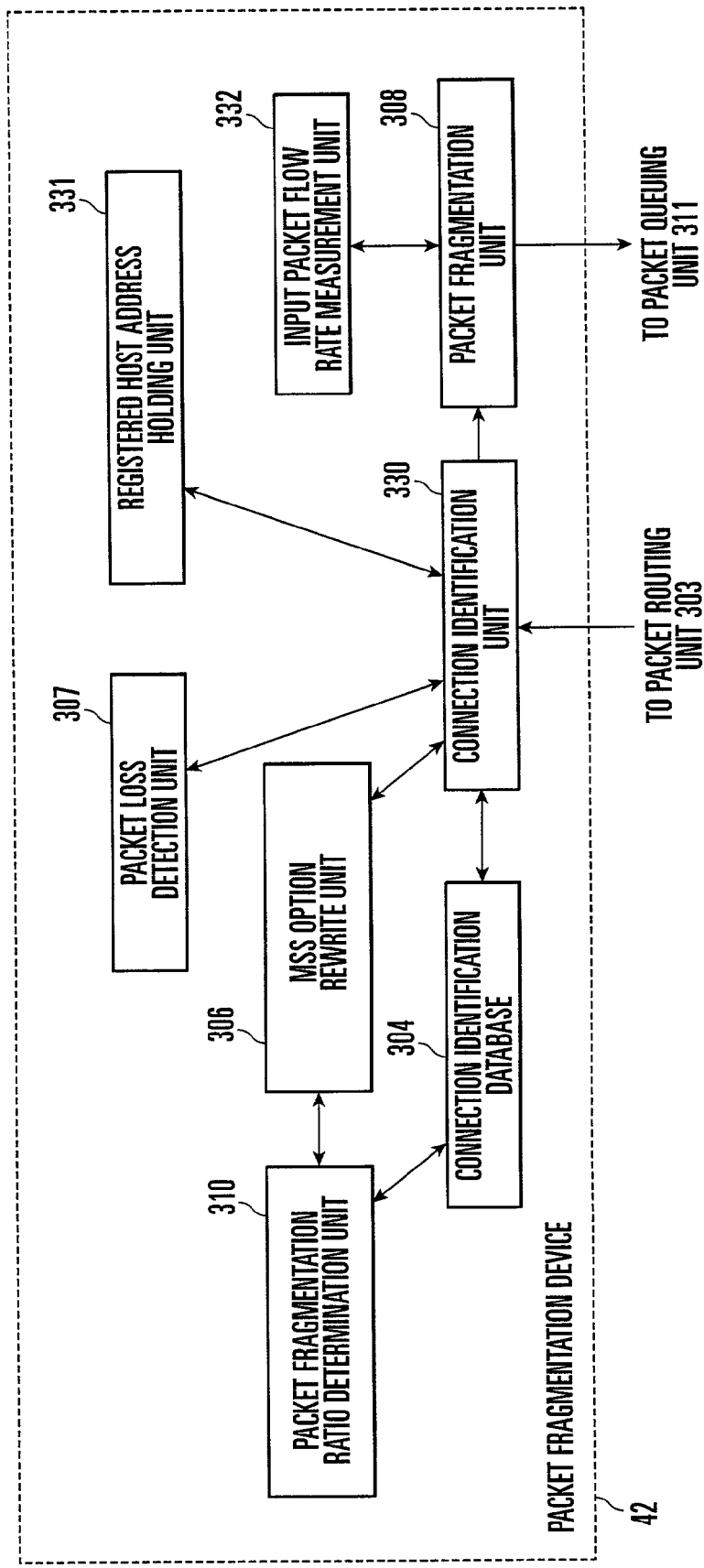
FIG. 8 is a block diagram showing a packet fragmentation device according to the third embodiment of the present invention.

In a packet fragmentation device 42 shown in FIG. 8, a registered host address holding unit 331 holds a host address set outside a packet transfer apparatus 20 or a pair of host addresses, and corresponding MSSs. When a connection identification unit 330 detects a new connection, the registered host address holding unit 331 checks whether this connection is a connection to a registered host address.

If the connection is not a connection to a registered host address, the registered host address holding unit 331 does not execute packet fragmentation. If the connection is a connection to a registered host address, the registered host address holding unit 331 notifies the connection identification unit 330 of a corresponding MSS so as to perform packet fragmentation.

For example, data links directly connected to the packet transfer apparatus 20 and a transmitting hosts 10 support an MTU as large as about 9 kbytes. However, the transfer path between the transmitting hosts 10 and the packet transfer apparatus 20 is known in advance to have a path MTU of 1.5 kbytes. At this time, even if the packet transfer apparatus 20 notifies the transmitting hosts 10 to use a large packet size in establishing a new connection, the transmitting hosts 10 decreases the packet size in accordance with the path MTU after the start of data transfer.

According to the second embodiment, procedures necessary for packet fragmentation are executed only in response to a new connection request from an address-registered transmitting or receiving host. Even if only some hosts have large path MTUs, the path MTU discovery occurrence frequency after the start of data transfer can be reduced to increase the packet transfer efficiency.

An input packet flow rate measurement unit 332 measures the real-time packet flow rate input to the packet transfer apparatus 20. Packet fragmentation is executed when the input packet flow rate measurement unit 332 detects that the packet flow rate input to the packet transfer apparatus 20 is equal to or lower than a predetermined threshold. If the packet flow rate exceeds the threshold, the input packet flow rate measurement unit 332 instructs the packet fragmentation unit 308 not to perform packet fragmentation.

To fragment a packet, various processes not included in normal packet transfer, such as detection of a new connection, identification of a connection to which a received packet belongs, rewrite and copying of a header, and check of an acknowledge sequence number must be executed. Overhead accompanying these processes does not cause any problem as far as the input packet flow rate is low. However, when various processes are sequentially performed by software and the input packet flow rate increases, the influence of degradation in packet transfer performance accompanying overhead may become more dominant than an increase in end-end transfer rate by packet fragmentation.

According to the second embodiment, degradation in packet transfer performance by overhead accompanying packet fragmentation can be prevented for a high load. For a low load, packet fragmentation can be performed to increase the end-end transfer rate.

Each processing in the packet transfer apparatus 20 shown in FIG. 1 will be explained in detail.

Figure 9:
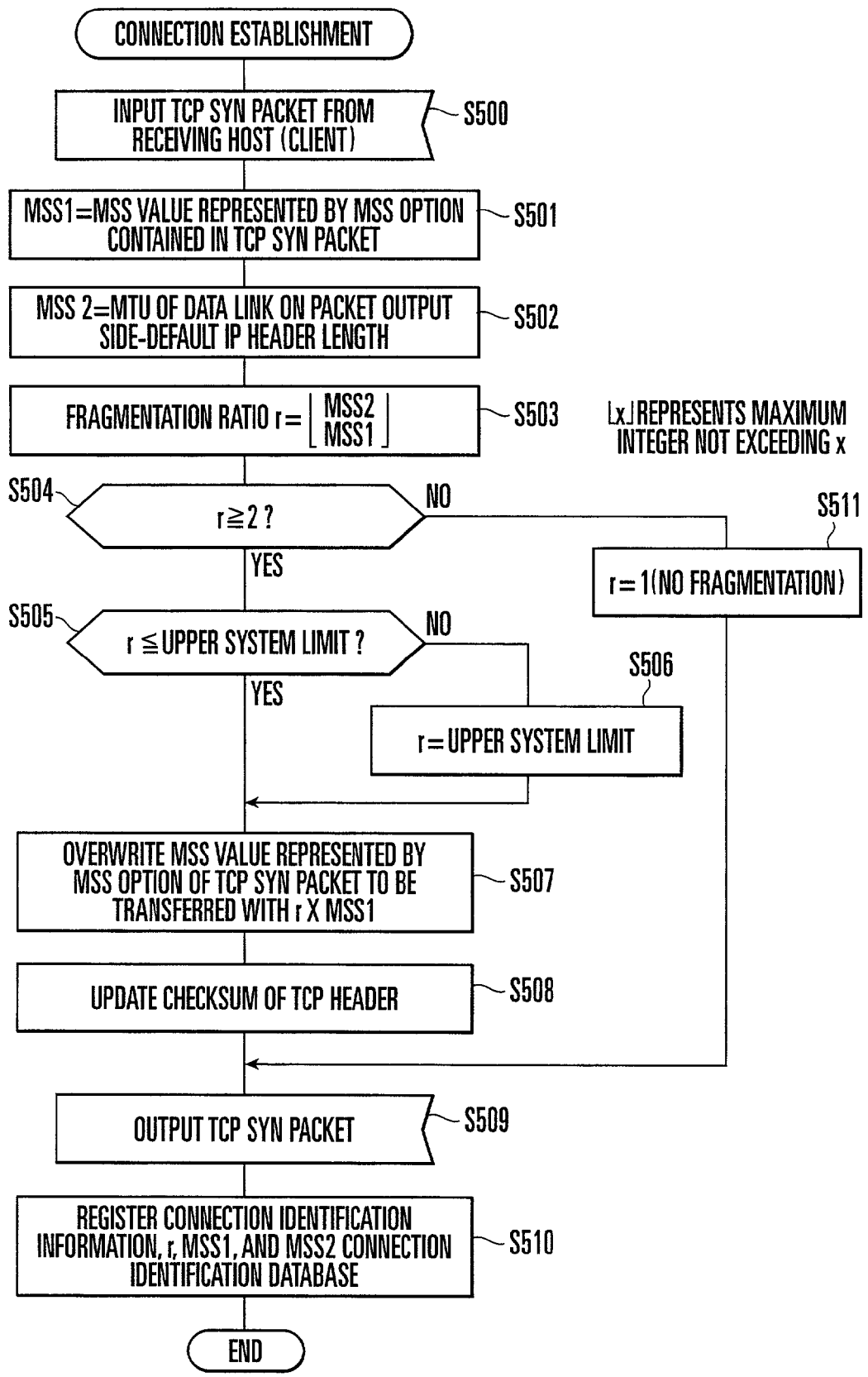
FIG. 9 is a flow chart showing connection establishment processing in the packet transfer apparatus shown in FIG. 1.

Connection establishment processing (upon reception of a TCP SYN packet) in the packet transfer apparatus 20 will be described with reference to FIG. 9. This processing is executed mainly by the MSS option rewrite unit 306 and packet fragmentation ratio determination unit 310 in FIG. 3.

In accordance with input of a TCP SYN packet (e.g., the packet 400 in FIG. 4) from the receiving hosts 30 (step S500), a value represented by the MSS option contained in the TCP SYN packet is acquired in the packet transfer apparatus 20, and stored as MSS1 (step S501). A value obtained by subtracting a default IP header length from the MTU of a packet output data link is stored as MSS2 (step S502).

MSS2 is fragmented by MSS1, and the quotient (integer) is set as a fragmentation ratio r (step S503). If the fragmentation ratio r is 2 or more (YES in step S504), r is so corrected as not to exceed the upper system limit (steps S505 and S506). An MSS value represented by the MSS option of a TCP SYN packet to be transferred is overwritten with r×MSS1 (step S507), and the checksum of the TCP header is updated (step S508).

The TCP SYN packet is transmitted to the transmitting hosts 10 (step S509), and connection identification information, the fragmentation ratio r, and the values MSS1 and MSS2 are registered in the connection identification database 304 (step S510). Then, a series of connection establishment processes end.

If NO in step S504, the fragmentation ratio r=1 is set, and no fragmentation processing is executed (step S511). Then, the flow shifts to step S509.

Figure 10:
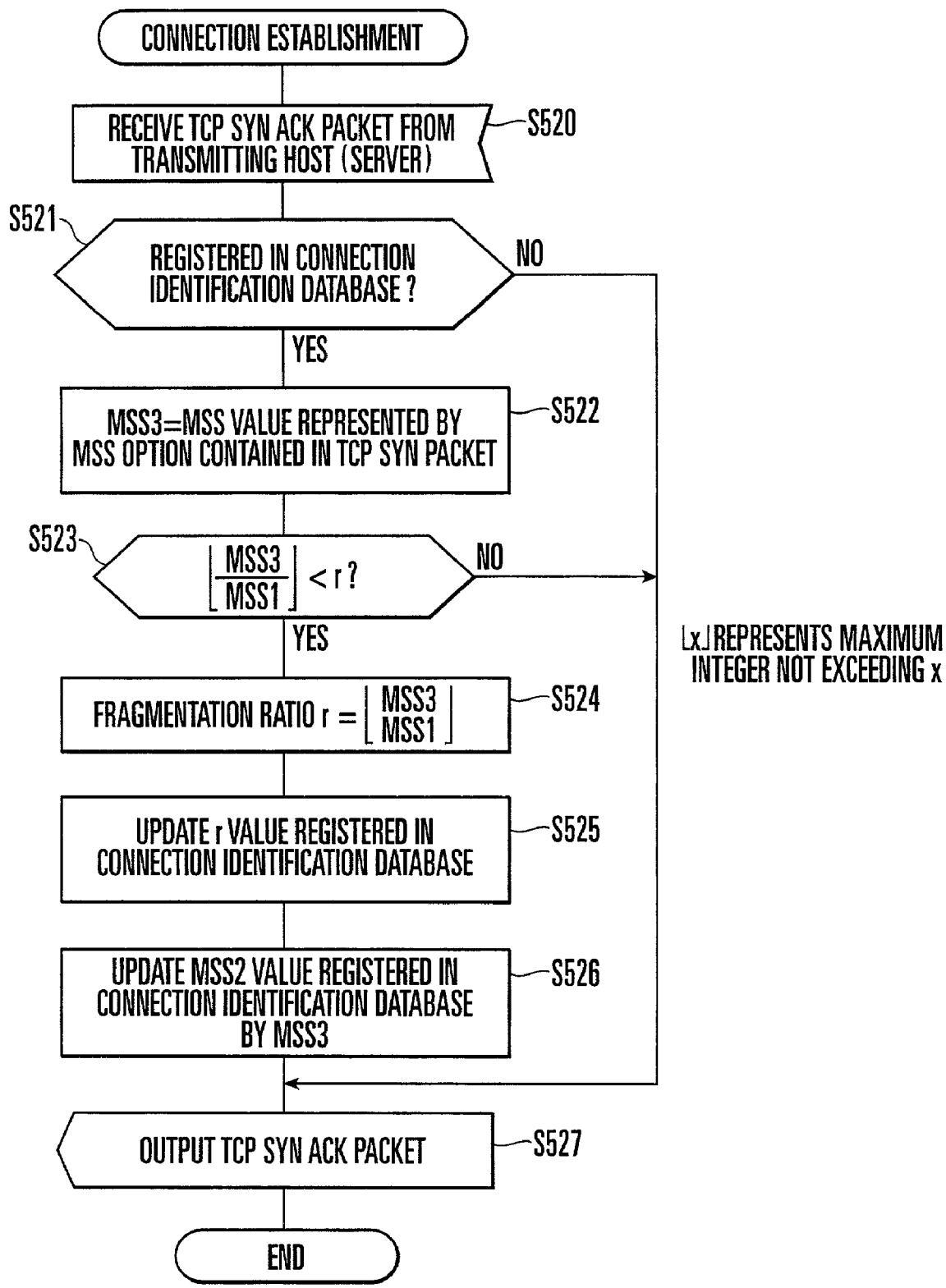
FIG. 10 is a flow chart showing another connection establishment processing in the packet transfer apparatus shown in FIG. 1.

Connection establishment processing (upon reception of a TCP SYN ACK packet) in the packet transfer apparatus 20 will be described with reference to FIG. 10. This processing is executed mainly by the MSS option rewrite unit 306 and packet fragmentation ratio determination unit 310 in FIG. 3.

In accordance with input of a TCP SYN ACK packet (e.g., 402 in FIG. 4) from the receiving hosts 30 (step S520), whether the current connection has already been registered in the connection identification database 304 is checked in the packet transfer apparatus 20 (step S521). If YES in step S521, an MSS value represented by the MSS option contained in the TCP SYN ACK packet is stored as MSS3 (step S522).

If a quotient (integer) obtained by fragmenting MSS3 by the above-described MSS1 (step S501 in FIG. 9) is smaller than the fragmentation ratio r set in the above-described connection establishment processing (step S503 in FIG. 9) (YES in step S523), the quotient is set as a new fragmentation ratio r (step S524). The r value registered in the connection identification database 304 is updated (step S525), and the registered MSS2 value is updated by MSS3 (step S526). Thereafter, a TCP SYN ACK packet from the transmitting hosts 10 is output to the receiving hosts 30 (step S527). A series of connection establishment processes end.

If NO in step S523, the flow shifts to step S527 without updating r. If NO in step S521, the flow shifts to step S527 without checking r.

Figure 11:
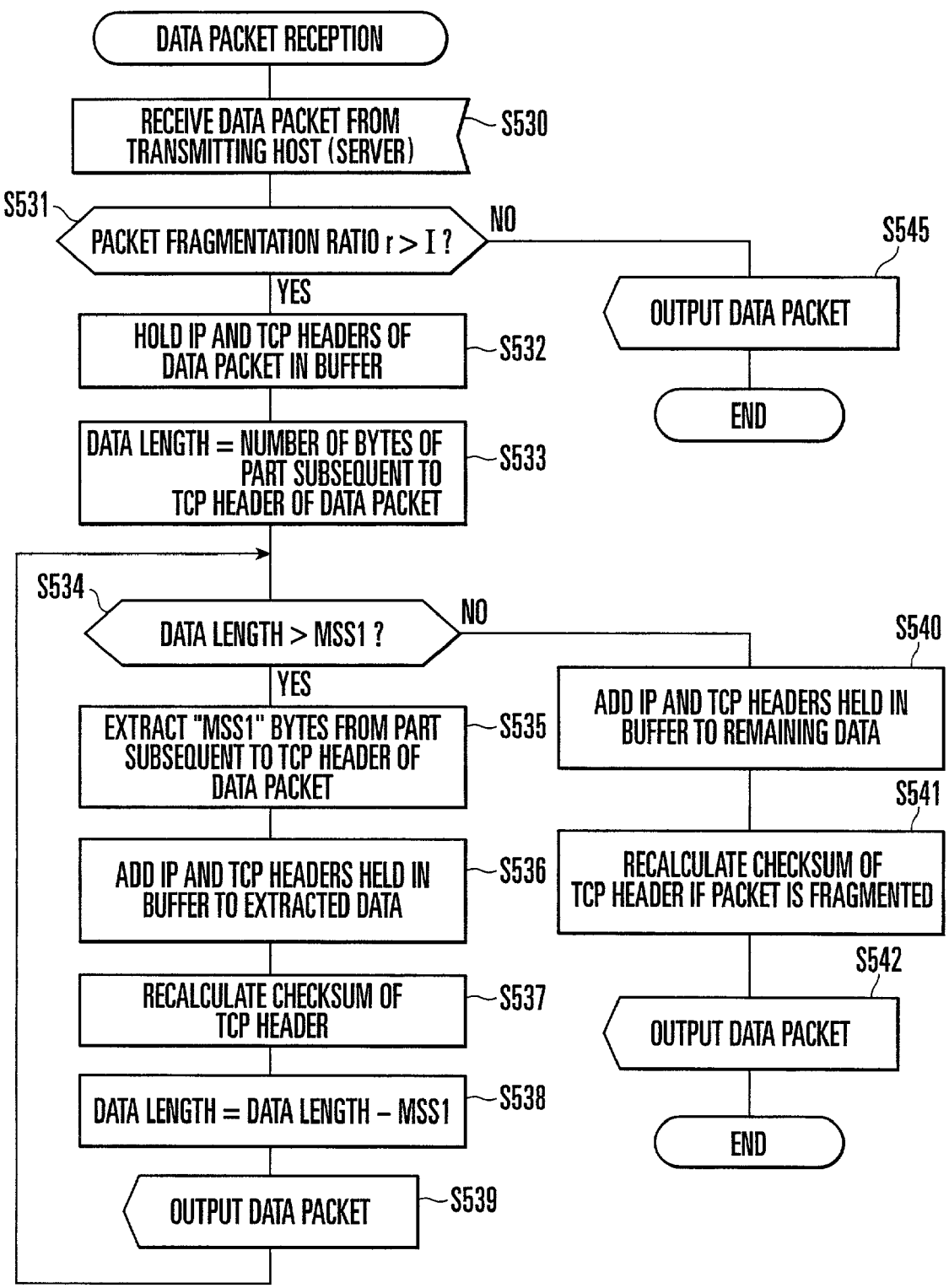
FIG. 11 is a flow chart showing data packet reception processing in the packet transfer apparatus shown in FIG. 1.

Data packet reception processing in the packet transfer apparatus 20 will be explained with reference to FIG. 11. This processing is executed mainly by the connection identification unit 305 and packet fragmentation unit 308 in FIG. 3.

If the packet transfer apparatus 20 receives a data packet (e.g., 406 in FIG. 4) from the transmitting hosts 10 (step S530), the fragmentation ratio r of the connection of the data packet is checked by referring to the connection identification database 304. If r is larger than 1 (YES in step S531), the IP and TCP headers of the data packet are held in the buffer (step S532). The number of bytes subsequent to the TCP header of the data packet is set as a data length (step S533).

If the data length is larger than MSS1 registered in advance (YES in step S534), "MSS1" bytes are extracted from a part subsequent to the TCP header of the data packet (step S535). The IP and TCP headers held in the buffer are added to the extracted data (step S536). The checksum of the TCP header is recalculated (step S537), and a value obtained by subtracting MSS1 from the data length is set as a new data length (step S538). After the data packet is output to the receiving hosts 30 (step S539), the flow returns to step S534.

If NO in step S534, the IP and TCP headers held in the buffer are added to the remaining data (step S540). After the packet is fragmented, the checksum of the TCP header is recalculated (step S541), and the data packet is output to the receiving hosts 30 (step S542). Accordingly, a series of data packet reception processes end.

If NO in step S531, the data packet is output to the receiving hosts 30 without any fragmentation processing (step S545). Then, a series of data packet reception processes end.

Figure 12:
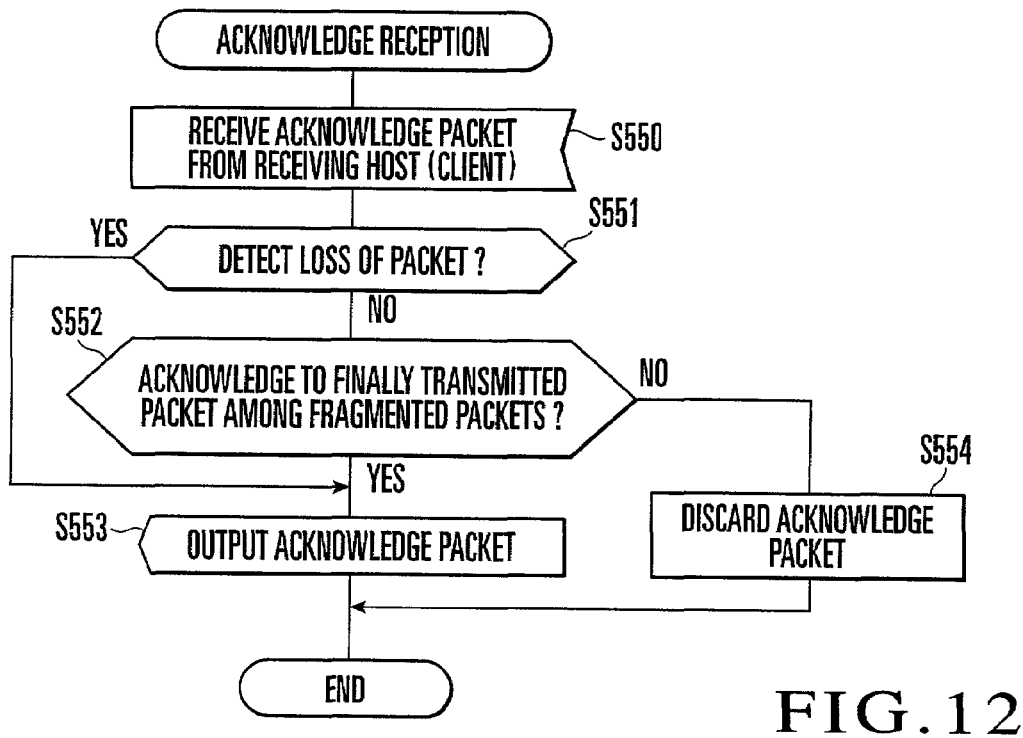
FIG. 12 is a flow chart showing acknowledge reception processing in the packet transfer apparatus shown in FIG. 1.

Acknowledge reception processing in the packet transfer apparatus 20 will be described with reference to FIG. 12. This processing is executed mainly by the connection identification unit 305 and acknowledge packet suppression unit 309 in FIG. 3.

If the packet transfer apparatus 20 receives an acknowledge packet (e.g., 413 in FIG. 4) from the receiving hosts 30 (step S550), whether the acknowledge packet represents packet loss detection is determined (step S551). If NO in step S551, whether the acknowledge packet is an acknowledge to a finally transmitted packet is checked (step S552).

If YES in step S552, the acknowledge packet is output to the transmitting hosts 10 (step S553). Then, a series of acknowledge reception processes end.

If YES in step S551, the flow shifts to step S553. If NO in step S552, the acknowledge packet is discarded (step S554). A series of acknowledge reception processes end.

Figure 13:
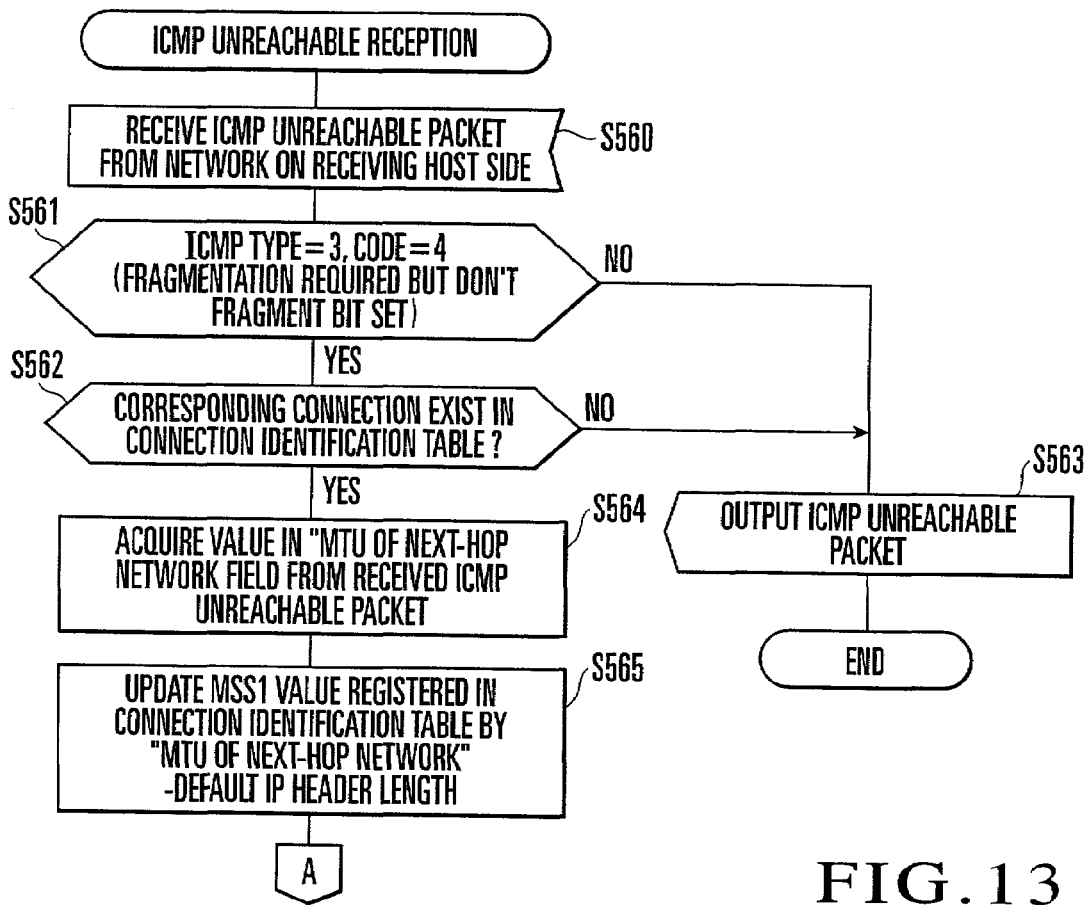
FIG. 13 is a flow chart showing ICMP unreachable reception processing in the packet transfer apparatus shown in FIG. 1.
Figure 14:
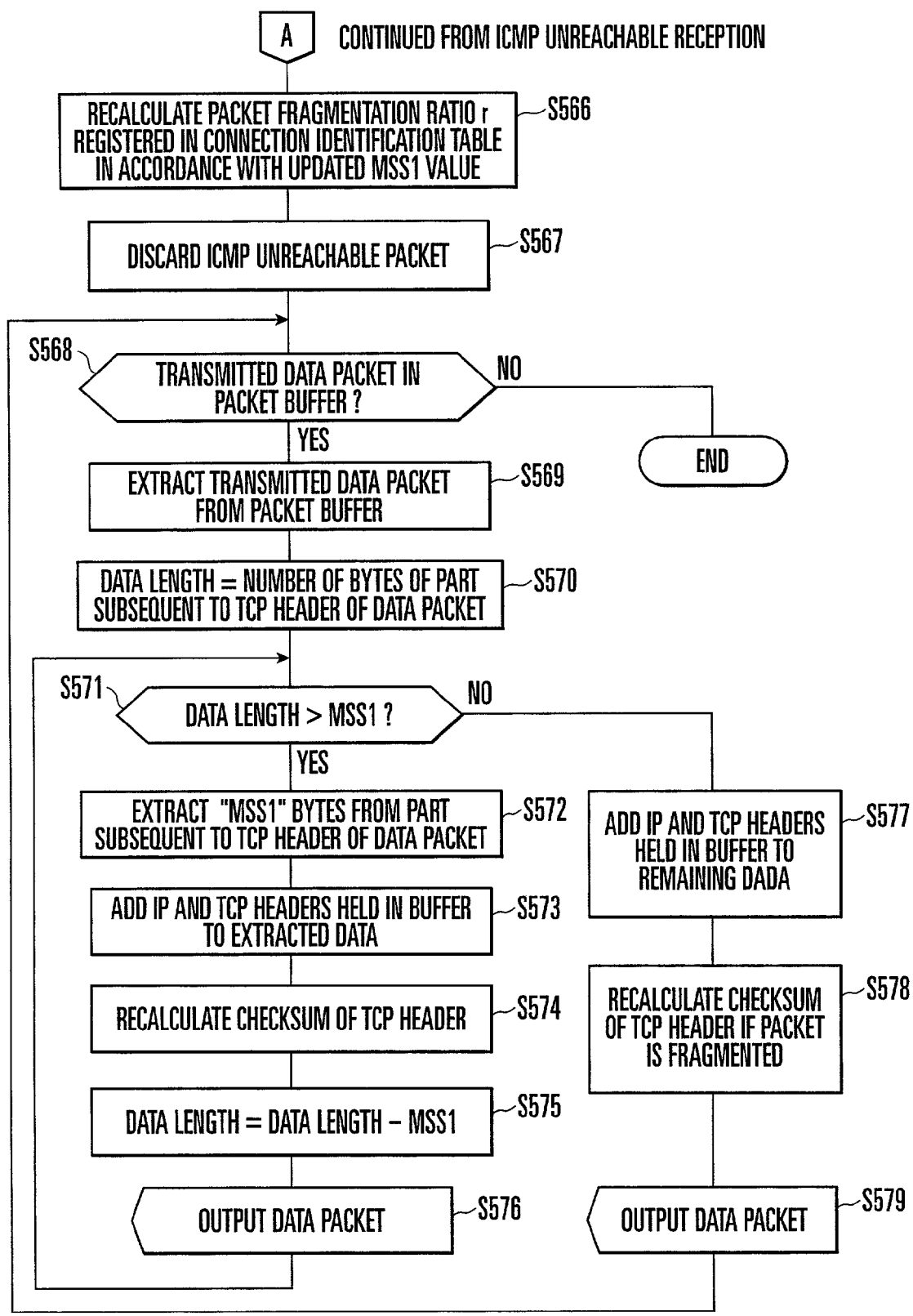
FIG. 14 is a flow chart showing ICMP unreachable reception processing in the packet transfer apparatus shown in FIG. 1.

ICMP unreachable reception processing in the packet transfer apparatus 20 will be explained with reference to FIGS. 13 and 14. This processing is executed mainly by the connection identification unit 320, ICMP unreachable packet detection unit 321, and packet buffer unit 322 in FIG. 6.

If the packet transfer apparatus 20 receives an ICMP unreachable packet from a network on the receiving hosts 30 side (step S560), conditions: ICMP type=3 and code=4 are confirmed from the ICMP unreachable packet (step S561). If these conditions are satisfied (YES in step S561), whether a corresponding connection has been registered in the connection identification database 304 is checked (step S562).

If NO in step S562, the ICMP unreachable packet is output to the transmitting hosts 10 (step S563). A series of ICMP unreachable reception processes end. If NO in step S561, the flow shifts to step S563.

If YES in step S562, a value in the "MTU of next-hop network" is acquired from the received ICMP unreachable packet (step S564). The MSS1 registered in the connection identification database 304 is updated by a value calculated by subtracting a default IP header length from the acquired value (step S565). The packet fragmentation ratio r registered in the connection identification database 304 is recalculated using the new MSS1 (step S566), and the ICMP unreachable packet is discarded (step S567).

Whether the packet buffer holds a transmitted data packet is checked (step S568). If YES in step S568, the transmitted data packet is extracted from the packet buffer (step S569). The number of bytes in a part subsequent to the TCP header of the data packet is set as a data length (step S570).

If the data length is larger than MSS1 (YES in step S571), "MSS1" bytes are extracted from a part subsequent to the TCP header of the data packet (step S572). The IP and TCP headers held in the buffer are added to the extracted data (step S573). The checksum of the TCP header is recalculated (step S574), and a value obtained by subtracting MSS1 from the data length is set as a new data length (step S575). After the data packet is output to the receiving hosts 30 (step S576), the flow returns to step S571.

If NO in step S571, the IP and TCP headers held in the buffer are added to the remaining data (step S577). The checksum of the TCP header is recalculated (step S578), the data packet is output to the receiving hosts 30 (step S579), and the flow returns to step S568. If no transmitted data packet exists in step S568 (NO in step S568), a series of ICMP unreachable reception processes end.

Figure 15:
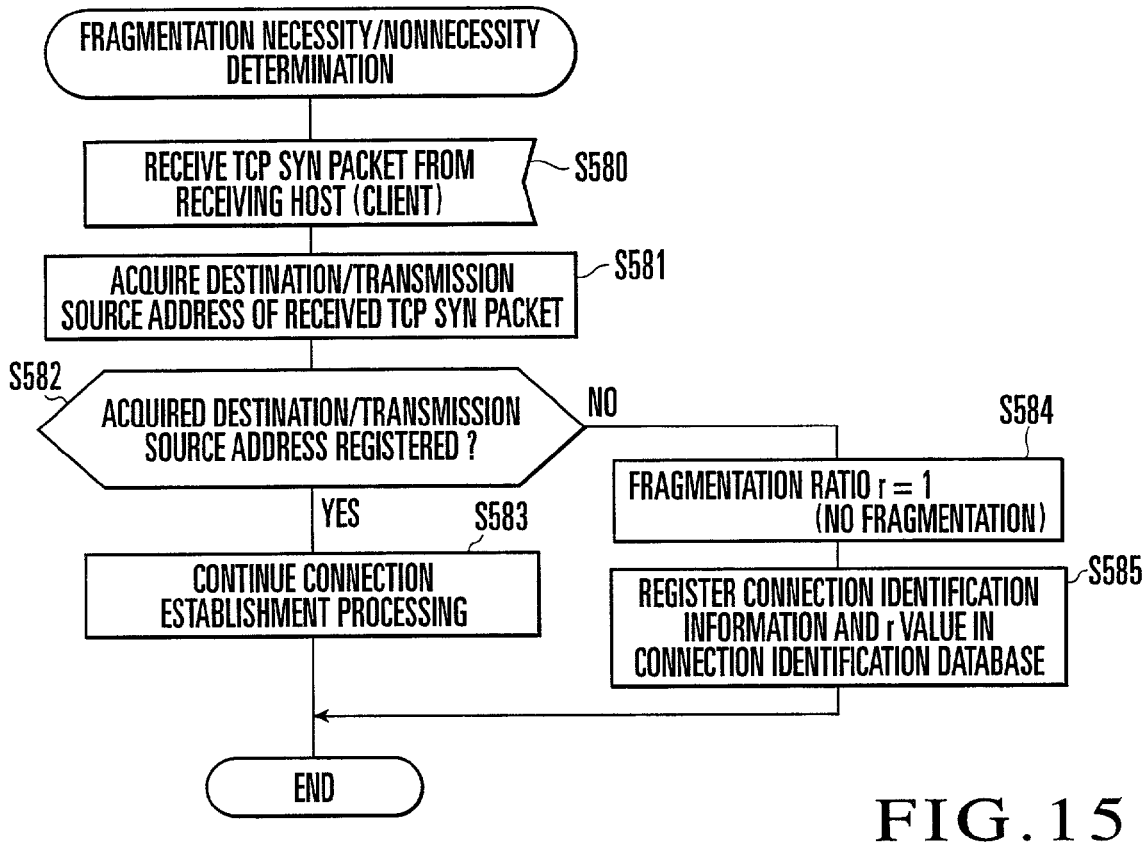
FIG. 15 is a flow chart showing fragmentation necessity/nonnecessity determination processing in the packet transfer apparatus shown in FIG. 1.

Fragmentation necessity/nonnecessity determination processing in the packet transfer apparatus 20 will be explained with reference to FIG. 15. This processing is executed mainly by the connection identification unit 330 and registered host address holding unit 331 in FIG. 8.

If the packet transfer apparatus 20 receives a TCP SYN packet from the receiving hosts 30 (step S580), the destination and transmission source addresses of the TCP SYN packet are acquired (step S581). Whether these addresses have been registered in the connection identification database 304 is checked (step S582).

If YES in step S582, connection establishment processing is determined to continue (step S583). Then, a series of fragmentation necessity/nonnecessity determination processes end. If NO in step S582, fragmentation is determined to be unnecessary, and the fragmentation ratio r=1 is set (step S584). The connection identification information and the fragmentation ratio r are registered in the connection identification database 304 (step S585). A series of fragmentation necessity/nonnecessity determination processes end.

Figure 16:
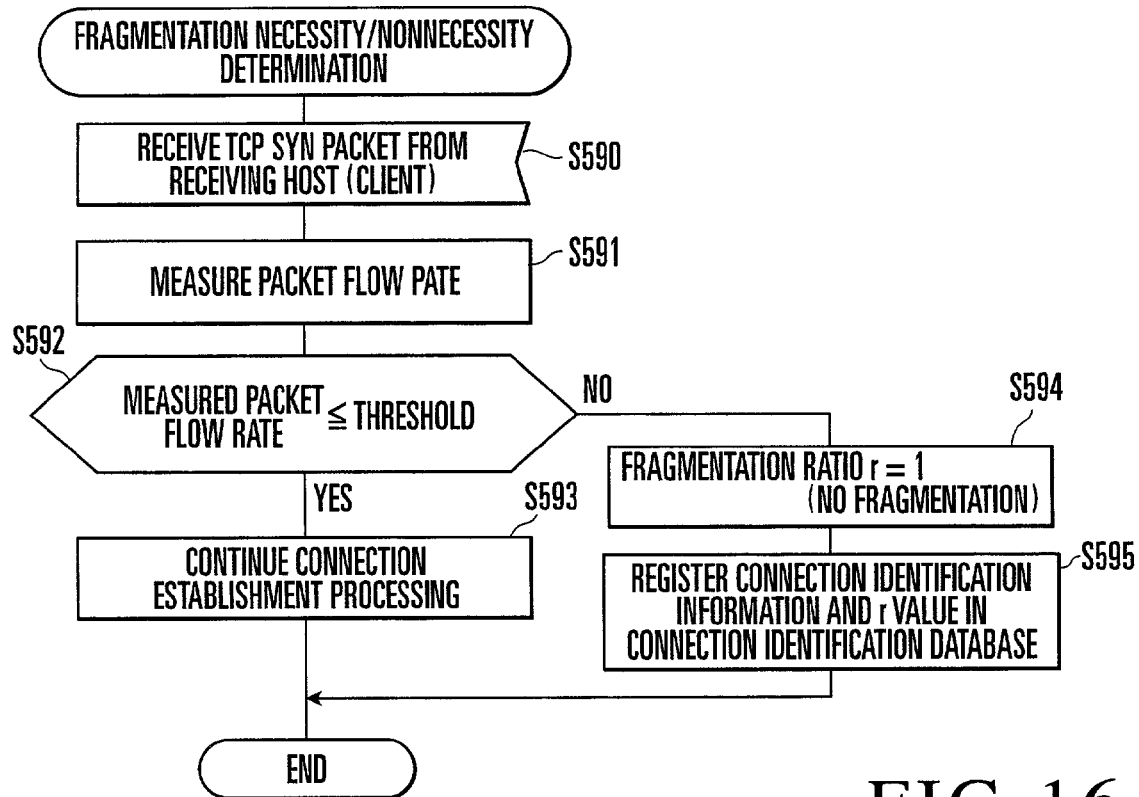
FIG. 16 is a flow chart showing another fragmentation necessity/nonnecessity determination processing in the packet transfer apparatus shown in FIG. 1.

Another fragmentation necessity/nonnecessity determination processing in the packet transfer apparatus 20 will be described with reference to FIG. 16. This processing is executed mainly by the connection identification unit 330 and input packet flow rate measurement unit 332 in FIG. 8.

If the packet transfer apparatus 20 receives a TCP SYN packet from the receiving hosts 30 (step S590), the packet flow rate at this time is measured (step S591). If the measured flow rate is equal to or less than a threshold (YES in step S592), connection establishment processing is determined to continue (step S593). Then, a series of fragmentation necessity/nonnecessity determination processes end.

If NO in step S592, the fragmentation ratio r=1 is set (step S594), and the connection identification information and the fragmentation ratio r are registered in the connection identification database 304 (step S595). Accordingly, a series of fragmentation necessity/nonnecessity determination processes end.

As has been described above, according to the present invention, maximum packet sizes independently used in respective packet transfer paths can be optimized on the basis of path information between the transmitting hosts and the packet transfer apparatus and path information between the packet transfer apparatus and the receiving hosts without terminating communication in the transport layer in the packet transfer apparatus. This results in high packet transfer efficiency.

For a large network transfer delay between the transmitting and receiving hosts, the default value of the congestion window can be effectively widened without changing the TCP packaging in the transmitting hosts. The transfer time can be shortened in transferring a small amount of data.

What is claimed is:

1. A packet transfer apparatus which is connected between transmitting and receiving hosts that perform packet communication complying with TCP/IP (Transmission Control Protocol/Internet Protocol), and transfers a packet on the basis of a connection established by exchanging control packets between the transmitting and receiving hosts before start of data packet exchange, comprising:

MSS option rewrite means for determining a first maximum segment size used in a transport layer between the transmitting hosts and said packet transfer apparatus on the basis of path information between the transmitting hosts and said packet transfer apparatus in establishing a connection, notifying the transmitting hosts of the first maximum segment size, determining a second maximum segment size used in a transport layer between the receiving hosts and said packet transfer apparatus on the basis of path information between the receiving hosts and said packet transfer apparatus, and notifying the receiving hosts of the second maximum segment size; and packet fragmentation means for, when the first maximum segment size of a connection corresponding to a transfer packet is larger than the second maximum segment size, fragmenting a data part subsequent to a header of a transport layer of a packet received from the transmitting hosts into a plurality of segments in accordance with the second maximum segment size, and transferring to the receiving hosts a fragmented packet assembled by adding a header copied from header information of the received packet to each fragmented segment.

2. An apparatus according to claim 1, wherein said packet fragmentation means rewrites a header field containing a sequence number of a fragmented packet and a checksum before transfer.

3. An apparatus according to claim 1, further comprising acknowledge packet suppression means for, when an acknowledge is received from the receiving hosts with respect to the fragmented packet transferred from said packet fragmentation means, discarding acknowledges to fragmented packets transferred before a finally transferred fragmented packet, and transferring only an acknowledge to the finally transferred fragmented packet to the transmitting hosts.

4. An apparatus according to claim 2, further comprising packet loss detection means for transferring a received acknowledge to the transmitting hosts when loss of a transferred fragmented packet is detected upon reception of an acknowledge from the receiving hosts.

5. An apparatus according to claim 1, further comprising packet fragmentation ratio determination means for determining the second maximum segment size so as to set a ratio of the first maximum segment size to the second maximum segment size to not less than 2.

6. An apparatus according to claim 1, further comprising packet fragmentation ratio determination means for determining the second maximum segment size so as to prevent a ratio of the first maximum segment size to the second maximum segment size from exceeding a preset value.

7. An apparatus according to claim 1, further comprising ICMP unreachable packet detection means for, when an ICMP (Internet Control Message Protocol) unreachable packet is received from a network on the receiving hosts side and data fragmentation is requested after start of data packet transfer from the transmitting hosts to the receiving hosts, decreasing the second maximum segment size on the basis of a maximum transfer unit value of a next-hop network represented by the ICMP unreachable packet without transferring the received ICMP unreachable packet.

8. An apparatus according to claim 1, further comprising registered host address holding means for instructing said packet fragmentation means to fragment a packet only when an address of one of the transmitting and receiving hosts serving as transfer packet destinations has been registered in advance.

9. An apparatus according to claim 1, further comprising input packet flow rate measurement means for, when an input packet flow rate is not more than a predetermined threshold, instructing said packet fragmentation means to fragment a packet, and when the input packet flow rate exceeds the threshold, instructing said packet fragmentation means so as not to fragment a packet.

10. A packet transfer method of transferring a packet on the basis of a connection set based on control packet exchange complying with TCP/IP (Transmission Control Protocol/Internet Protocol) between transmitting and receiving hosts before start of data packet exchange in a packet transfer apparatus connected between the transmitting and receiving hosts that perform packet communication, comprising the steps of:

determining a first maximum segment size used in a transport layer between the transmitting hosts and the packet transfer apparatus on the basis of path information between the transmitting hosts and the packet transfer apparatus in establishing a connection, thereby notifying the transmitting hosts of the first maximum segment size;

determining a second maximum segment size used in a transport layer between the receiving hosts and the packet transfer apparatus on the basis of path information between the receiving hosts and the packet transfer apparatus, thereby notifying the receiving hosts of the second maximum segment size;

when the first maximum segment size of a connection corresponding to a transfer packet is larger than the second maximum segment size, fragmenting a data part subsequent to a header of a transport layer of a packet received from the transmitting hosts into a plurality of segments in accordance with the second maximum segment size without terminating communication in the transport layer in the packet transfer apparatus; and transferring to the receiving hosts a fragmented packet assembled by adding a header copied from header information of the received packet to each fragmented segment.

11. A method according to claim 10, wherein the transfer step further comprises the step of rewriting a header field containing a sequence number of a fragmented packet and a checksum before transfer.

12. A method according to claim 10, further comprising the step of, when an acknowledge is received from the receiving hosts with respect to the fragmented packet transferred in the packet fragmentation step, discarding acknowledges to fragmented packets transferred before a finally transferred fragmented packet, and transferring only an acknowledge to the finally transferred fragmented packet to the transmitting hosts.

13. A method according to claim 12, further comprising the step of transferring a received acknowledge to the transmitting hosts when loss of a transferred fragmented packet is detected upon reception of an acknowledge from the receiving hosts.

14. A method according to claim 10, further comprising the step of determining the second maximum segment size so as to set a ratio of the first maximum segment size to the second maximum segment size to not less than 2.

15. A method according to claim 10, further comprising the step of determining the second maximum segment size so as to prevent a ratio of the first maximum segment size to the second maximum segment size from exceeding a preset value.

16. A method according to claim 10, further comprising the step of, when an ICMP (Internet Control Message Protocol) unreachable packet is received from a network on the receiving hosts side and data fragmentation is requested after start of data packet transfer from the transmitting hosts to the receiving hosts, decreasing the second maximum segment size on the basis of a maximum transfer unit value of a next-hop network represented by the ICMP unreachable packet without transferring the received ICMP unreachable packet.

17. A method according to claim 10, further comprising the step of instructing packet fragmentation means to fragment a packet only when an address of one of the transmitting and receiving hosts serving as transfer packet destinations has been registered in advance.

18. A method according to claim 10, further comprising the step of, when an input packet flow rate is not more than a predetermined threshold, instructing packet fragmentation means to fragment a packet, and when the input packet flow rate exceeds the threshold, instructing the packet fragmentation means so as not to fragment a packet.

* * * * *